(12) United States Patent
Chintagunta et al.

(10) Patent No.: US 11,983,519 B2
(45) Date of Patent: *May 14, 2024

(54) ABORT INSTALLATION OF FIRMWARE BUNDLES

(71) Applicant: Hewlett Packard Enterprise Development LP, Houston, TX (US)

(72) Inventors: Murali Mohan Chakravarthy Chintagunta, Karnataka (IN); Suneeth Sathyanathan, Karnataka (IN); Sirish Nimmakayala, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,392

(22) Filed: Jun. 28, 2022

(65) Prior Publication Data

US 2022/0326927 A1    Oct. 13, 2022

Related U.S. Application Data

(63) Continuation of application No. 16/245,186, filed on Jan. 10, 2019, now Pat. No. 11,397,570.

(51) Int. Cl.
*G06F 8/61* (2018.01)
*G06F 8/65* (2018.01)
*G06F 16/907* (2019.01)

(52) U.S. Cl.
CPC .................. *G06F 8/61* (2013.01); *G06F 8/65* (2013.01); *G06F 16/907* (2019.01)

(58) Field of Classification Search
CPC .............. G06F 8/61; G06F 8/65; G06F 16/97
See application file for complete search history.

(56) References Cited

U.S. PATENT DOCUMENTS

| 6,363,499 | B1* | 3/2002 | Delo ...................... G06F 8/62 714/E11.135 |
| 8,287,381 | B2 | 10/2012 | Gagner et al. |
| 9,112,891 | B2 | 8/2015 | Pathak |

(Continued)

OTHER PUBLICATIONS

Shenoy, A. et al.; "Handling the Firmware Update Dependency by Using Lifecycle Controller 3.00.00.00 in the 14th Generation Dell EMC PowerEdge Servers", Dell EMC, Jun. 2017, 10 pages.

*Primary Examiner* — Wei Y Zhen
*Assistant Examiner* — Brahim Bourzik
(74) *Attorney, Agent, or Firm* — Trop, Pruner & Hu, P.C.

(57) ABSTRACT

Examples of aborting installation of a firmware bundle are described. In an example, an abort installation command is received. The firmware bundle includes items, each item corresponding to one of a firmware for a hardware component and a system software component. A first set of items is identified from the items, where the first set of items includes one of an item installed successfully, an item for which installation is under progress, and a combination thereof. A second set of items is identified from the items, where the second set of items is pending installation. A first subset of items is identified from the second set, based on predefined dependency information, where operability of an item from the first set is dependent on an item from the first subset. The first subset of items is installed prior to aborting installation of the firmware bundle.

20 Claims, 6 Drawing Sheets

(56) References Cited

U.S. PATENT DOCUMENTS

| | | | |
|---|---|---|---|
| 2003/0018964 A1* | 1/2003 | Fox | G06F 8/61 717/170 |
| 2004/0060045 A1* | 3/2004 | Hind | G06F 11/2247 717/124 |
| 2004/0255291 A1* | 12/2004 | Sierer | G06F 8/61 717/174 |
| 2005/0102666 A1* | 5/2005 | Barta | G06F 8/61 717/174 |
| 2005/0125788 A1 | 6/2005 | Lupini et al. | |
| 2005/0132350 A1* | 6/2005 | Markley | G06F 8/65 717/174 |
| 2005/0289513 A1 | 12/2005 | Chen et al. | |
| 2006/0010425 A1 | 1/2006 | Willadsen et al. | |
| 2006/0020937 A1 | 1/2006 | Schaefer | |
| 2006/0031827 A1 | 2/2006 | Barfield et al. | |
| 2014/0259009 A1* | 9/2014 | Bhattiprolu | G06F 8/61 717/174 |
| 2014/0359593 A1* | 12/2014 | Cohen | G06F 8/65 717/169 |
| 2015/0186125 A1 | 7/2015 | Avery et al. | |
| 2016/0034315 A1* | 2/2016 | Soejima | G06F 9/5038 718/103 |
| 2016/0132214 A1 | 5/2016 | Koushik et al. | |
| 2016/0170388 A1 | 6/2016 | Haas et al. | |
| 2016/0306618 A1* | 10/2016 | Bansod | G06F 8/65 |
| 2016/0337476 A1 | 11/2016 | Wilkinson et al. | |
| 2018/0219972 A1 | 8/2018 | Vintzel et al. | |

\* cited by examiner

System 100

Processor(s) 102

Memory 104

[[Identify a first set of items from a plurality of items included in a firmware bundle on receiving a command to abort installation of the firmware bundle while the installation is under progress, each of the plurality of items corresponding to one of a firmware for a hardware component of the system and a system software component, where the first set of items includes one of an item installed successfully, an item for which installation is under progress, and a combination thereof;

Identify a second set of items from the plurality of items, wherein the second set of items is pending installation;

Identify a first subset of items from the second set of items, based on predefined dependency information, the predefined dependency information being indicative of operational dependency between the plurality of items, wherein operability of an item from the first set is dependent on an item from the first subset of items; and Install the first subset of items; and Abort installation of the firmware bundle after the first subset of items is installed]]

Fig. 1

ABORT INSTALLATION OF FIRMWARE BUNDLES

BACKGROUND

Electronic devices, such as computers, include multiple hardware components programmed with their respective firmware. Firmware programmed on a hardware component of an electronic device provides control of the hardware component and enables the hardware component to interact with other hardware components of the electronic device. The firmware may be stored in a non-volatile memory associated with the hardware component. The respective firmware of the hardware components may be updated for fixing bugs, for introducing additional features to the hardware component, and for version upgrade.

BRIEF DESCRIPTION OF DRAWINGS

The following detailed description references the drawings, wherein:

FIG. 1 illustrates a system for aborting installation of a firmware bundle, according to an example;

DETAILED DESCRIPTION

Figure 2:
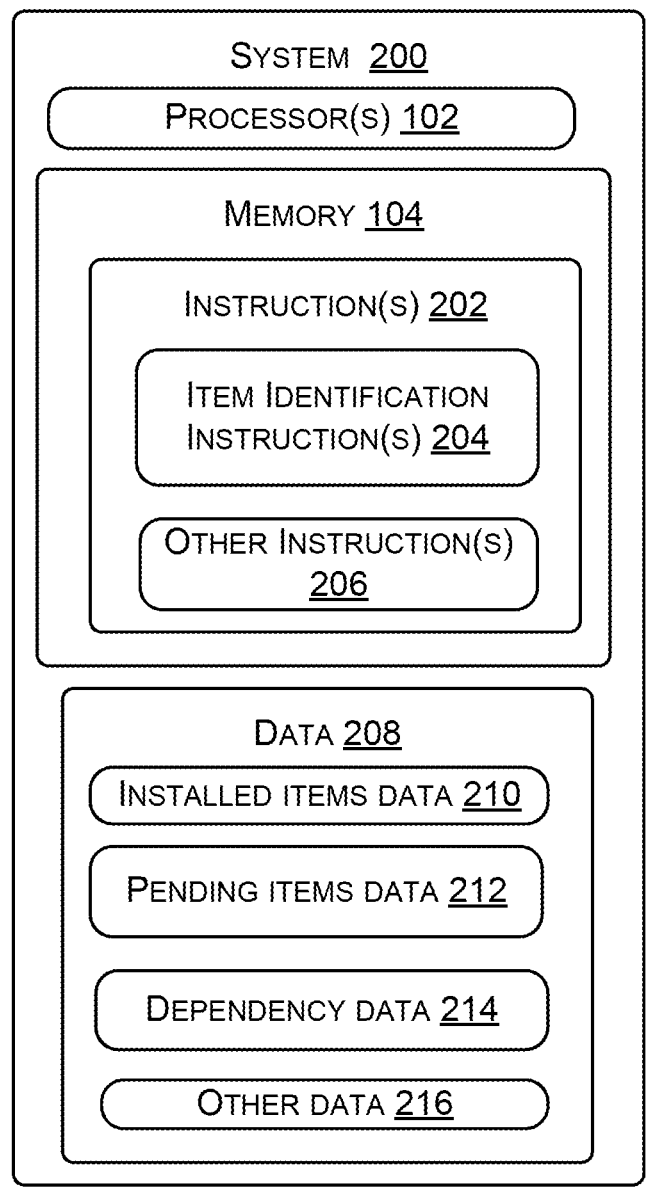
FIG. 2 illustrates a system for aborting installation of the firmware bundle, according to another example.

Updating firmware of a system generally includes installation of a firmware bundle in the system. The system may be a computing system having data processing, data storage, and networking capabilities. Examples of the system includes personal computers, servers, controllers, embedded devices, network switches, or the like. The system may include different hardware components having dedicated functionality. A hardware component refers to physical, tangible parts of the system, such as a management processor, a central processing unit, a random-access memory, a network interface card, a hard disk, a storage card, etc. Each hardware component may run a respective firmware which controls low-level functioning of the hardware component. A firmware bundle is a collection of respective firmware of the hardware components and system software components. The firmware bundle may be installed for upgrade of respective firmware of the hardware components and the system software components. The system software components include computer programs that are designed to run a computer's hardware and application programs. The system software components may be referred to as an interface between the hardware and user applications. In an example, the firmware bundle may include firmware packages, drivers, agents, and utilities. Firmware bundles may be installed to facilitate upgrading of firmware and system software on servers, controllers, and storage units.

While installation of the firmware bundle, respective firmware or drivers of each hardware component of the system may be sequentially upgraded. Respective firmware of the hardware components may be arranged in an order of installation and may be sequentially installed one after another, as per the order of installation. When installation of the firmware bundle is abruptly aborted, before completion, the firmware of the components in the system may get corrupt. In some cases, due to the abruptly aborted installation, firmware of one hardware component may be upgraded to a new version whereas firmware of another hardware component may remain in an old version. The new version of the firmware may not be compatible with the old version thereby rendering the system inoperable.

For aborting installation of the firmware bundle before completion, generally, a rollback technique may be used. In the rollback technique, when the installation is aborted, all the successfully installed firmware packages of respective hardware components are downgraded to a state as existed prior to the installation. However, firmware rollback consumes processing resource and may be time consuming. Further, in the rollback technique, if installation of the firmware bundle is abruptly aborted during installation of a firmware which is arranged at the last in the order of installation, firmware of all the components which were previously installed successfully, are rolled back. This may further increase processing resource consumption and time consumption for the roll back. Further, when successfully installed firmware of the hardware components are attempted to be downgraded, the roll back operation may fail for the firmware of some hardware components. This may cause some of the hardware components of the system to run an upgraded version of firmware while other hardware components of the system may run older versions of firmware. The upgraded version of a firmware may not be compatible with the older version of another firmware thereby rendering the system inoperable.

Further, in another technique, hard disks of systems may have multiple flash partitions. A firmware bundle installation may be performed on a standby flash partition. Once the installation is completed, the standby flash partition may be made active. This technique of using a standby partition for installation of a firmware bundle may be used for embedded devices and network switches. However, enterprise servers and System on Chip (SoC)-based devices may not have flash partitions. Further, enterprise servers may include hardware components manufactured by different vendors which may not allow firmware bundle installation in a standby flash partition. Also, firmware bundle installation using a flash partition may consume substantial amount of storage space of the system. Manufacture of systems with greater storage space may increase manufacturing costs.

The present disclosure facilitates in aborting installation of a firmware bundle without adversely affecting the system's operability. According to the present disclosure, an abort installation command may be received by a system while installation of a firmware bundle is under progress. The firmware bundle includes a plurality of items. Each of the plurality of items correspond to one of a firmware for a hardware component of the system and a system software component. Installation of the firmware bundle in the system refers to processes carried out for transfer of computer readable instructions corresponding to firmware/drivers of respective hardware components of the system onto memory associated with the respective hardware components, so that the installed firmware/drivers are ready for execution.

From the plurality of items included in the firmware bundle, a first set of items is identified. The first set of items includes one of an item installed successfully, an item for which installation is under progress, and a combination thereof. After installation of an item is complete, the item is referred to as a successfully installed item and an item for which installation is being processed when the abort installation command is received is referred to as a current installing item. In an example, when the abort installation command is received, if there are no successfully installed item(s), the first set of items may include the current installing item. A second set of items is identified from the plurality of items, where the second set of items is pending installation. An item for which installation has not been initiated and which is queued for installation when the abort installation command is received, is referred to as an item pending installation.

A first subset of items is identified from the second set of items, based on predefined dependency information. The predefined dependency information is indicative of operational dependency between the plurality of items, where operability of an item from the first set is dependent on an item from the first subset of items. The first subset of items is installed prior to aborting installation of the firmware bundle. After, the first subset of items is installed, the installation of the firmware bundle may be aborted. Aborting installation of the firmware bundle refers to termination of the processes related to deployment of the firmware bundle in the system without the firmware bundle being completely deployed in the system.

Since, according to the present disclosure, the first subset of items on which the successfully installed item(s) and the currently installing item are dependent, gets installed before aborting the firmware bundle installation, therefore, the successfully installed item(s) and the currently installing item remain functional even after the installation is aborted. Thus, according to the present disclosure, the firmware bundle installation may be aborted before completion without hampering operability of the successfully installed item(s) and the currently installing item. As the successfully installed item(s) and the currently installing item remain functional, the system remains operational even after installation of the firmware bundle is aborted before successful completion.

This may allow in reducing downtime of the system during a maintenance activity. Further, during a maintenance activity, when installation of a firmware bundle consumes more time than planned, such installation may be aborted without adversely affecting the operability of the system. Further, in a scenario where a datacenter encounters a network connectivity issue or a power outage, a running installation of a firmware bundle in a server may be aborted according to the present disclosure while maintaining the operability of the server. Further, when accidentally a firmware bundle which is incompatible for a system is used to upgrade the firmware of the hardware components of the system, the present disclosure may enable aborting installation of the incompatible firmware bundle while maintaining the operability of the system. Since, the system remains operable even after abruptly aborting an installation of a firmware bundle, additional overhead expenses on resource personnel for repairing the system may also be reduced.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a system 100 for aborting installation of a firmware bundle, according to an example. The system 100 may be a computing system having data processing, storage, and networking capabilities. Examples of the system 100 include personal computers, enterprise servers, network switches, embedded systems, controllers, SOC-based devices, or the like.

The system 100 includes a processor 102 and a memory 104 coupled to the processor 102. The memory 104 stores instructions executable by the processor 102. The instructions when executed by the processor 102 may cause the processor 102 to initiate installation of a firmware bundle. The firmware bundle includes a plurality of items. Each item corresponds to a firmware for a hardware component of the system 100 or a system software component of the system 100.

Examples of the hardware component include a management processor, a central processing unit, a random-access memory, a network interface card, a hard disk, a storage card, etc. The firmware bundle may include firmware associated with each of the hardware components. Examples of system software components include device drivers which control specific devices, such as a keyboard or a mouse, that are attachable to the system 100, system utility tools, such as disk defragmenter and system restore, and development tools such as compilers and debuggers. In an example, when installation of the firmware bundle is initiated, the items included in the firmware bundle may be arranged in a sequential order in an installation queue. The installation queue maintains a list of the items which are pending installation.

While the installation of the firmware bundle is under progress, the instructions when executed by the processor 102 may cause the processor 102 to receive an abort installation command from a user or system administrator. In an example, the abort installation command may be represented by a user input from a user or system administrator, where the user input indicates that the installation of the firmware bundle is to be aborted.

After, the abort installation command is received, the instructions when executed by the processor 102 cause the processor 102 to identify a first set of items from the plurality of items included in the firmware bundle. The first set of items includes one of an item installed successfully, an item for which installation is under progress, or both.

Further, the instructions when executed by the processor 102 cause the processor 102 to identify a second set of items from the plurality of items, where the second set of items is pending installation. The second set of items which are pending installation and are arranged in the installation queue may also be referred to as items staged for installation.

Further, the instructions when executed by the processor 102 cause the processor 102 to identify a first subset of items from the second set of items, based on predefined dependency information. The predefined dependency information is indicative of operational dependency between the plurality of items, where operability of an item from the first set is dependent on an item from the first subset of items. According to the predefined dependency information, hardware components of the system 100 are able to run the firmware or drivers included in the first set of items after the first subset of items are installed in the system 100. The predefined dependency information may include a functional correlation between the first set of items and the first subset of items. In an example, the predefined dependency information is stored as a dependency list in a firmware image of the firmware bundle. The firmware image is a binary executable file that may contain instructions corresponding to firmware of hardware components of the system 100. The firmware image may be installed for upgrading a firmware version of the hardware components of the system 100. In an example, the dependency list may be stored as a metadata file in one of an Extensible Markup Language (xml) file format, a JavaScript Object Notation (json) file format, and a Text (txt) file format.

Further, the instructions when executed by the processor 102 cause the processor 102 to install the first subset of items prior to aborting installation of the firmware bundle. Thus, the first subset of items, on which operability of the successfully installed item(s) and the currently installing item are dependent, are installed before aborting installation of the firmware bundle. After installation of the first subset of items, the instructions when executed by the processor 102 cause the processor 102 to abort the installation of the firmware bundle. With the present disclosure, since, the successfully installed item(s) and the currently installing item remain functional, the system 100 also remains operational after installation of the firmware bundle is aborted before completion.

FIG. 2 illustrates a system 200, for aborting installation of a firmware bundle, according to an example. In an example, the system 200 may be an enterprise server in a datacenter, a network switch, an embedded device, and a SoC-based computing architecture.

The system 200 includes the processor 102 and the memory 104 coupled to the processor 102. The memory 104 stores instructions executable by the processor 102. The processor 102 may be implemented as microprocessors, microcomputers, microcontrollers, digital signal processors, central processing units, state machines, logic circuitries, and any devices that manipulate signals based on operational instructions. Among other capabilities, the processor 102 is configured to fetch and execute computer-readable instructions stored in the memory 104. The computer-readable instructions, also referred to as instructions, includes instruction(s) 202. The instructions(s) 202 may include routines, programs, components, applications, data structures, and the like, which perform particular tasks or implement particular abstract data types. The instructions, being executable by the processor(s), may also be referred to as processor-executable instructions. The execution of the instructions to perform a function may be interchangeably referred to as the instructions causing performance of the function or the instructions enabling performance of the function.

The functions of the various elements shown in the FIG. 2, including any functional blocks labeled as "processor(s)", may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other custom-built hardware, may also be included.

The memory 104 may include any computer-readable medium known in the art including, for example, volatile memory (e.g., RAM), and/or non-volatile memory (e.g., EPROM, flash memory, etc.). The instruction(s) 202 include item identification instruction(s) 204 which corresponds to instructions stored on a computer-readable medium and executable by a processor to identify the first set of items, the second set of items, the first subset of items, the second subset of items, and the third subset of items. The instruction(s) 202 also comprise other instruction(s) 205 that supplement applications on the system 200, for example, execution of functions of an operating system.

Data 208 serves, amongst other things, as a repository for storing data that may be fetched, processed, received, or generated during execution of the instruction(s) 202 by the processor 102. The data 208 includes installed items data 210 which stores data relating to firmware or drivers from the firmware bundle which are successfully installed, pending items data 212 which stores data relating to firmware or drivers from the firmware bundle which are pending installation, and dependency data 214 which stores data relating to operational dependency between firmware/drivers of one hardware component and firmware/drivers of another hardware component. The system 100 also comprises other data 216 that may be fetched, processed, received, or generated during execution of other instruction(s) 206.

Consider that installation of a firmware bundle is under progress in the system 200. The firmware bundle may include items corresponding to firmware or drivers for hardware components of the system 200. In an example, installation of the firmware bundle may be initiated by executing a firmware image. During installation of the firmware bundle, each item is sequentially arranged in an installation queue and based on the sequence in the installation queue the items are installed one after another. Once an item gets successfully installed, the item may be removed from the installation queue or may be flagged as a successfully installed item. An item for which installation is under progress may also be flagged in the installation queue as a currently installing item. In an example, the installation queue maintains a list of items which are pending installation.

The items in the firmware bundle may be operationally dependent on one another. For example, a firmware/driver of component A may be operationally dependent on a firmware/driver of component B. In the example, for execution of the firmware/driver of the component A, the firmware/driver of component B is to be programmed in the component B. Operational dependency between the items in the firmware bundle may be indicated through predefined dependency information. The predefined dependency information may be stored as a dependency list in a metadata file within the firmware image. The metadata file may be maintained in one of an Extensible Markup Language (xml) file format, a JavaScript Object Notation (json) file format, and a Text (txt) file format.

During installation of the firmware bundle, an abort installation command may be received by the system 200. In an example, the abort installation command may be a user input from a user/administrator. After receiving the abort installation command, the item identification instruction(s) 204 when executed by the processor 102, cause the processor 102 to identify whether installation of the firmware bundle is completed. In an example, the item identification instruction(s) 204 may cause the processor 102 to check whether an update successful message has been generated by the firmware image. If the update successful message is generated, then it is identified that the installation of the firmware bundle is successfully completed. If the update successful message is not generated, then it is identified that the installation of the firmware bundle is under progress.

When it identified that installation of the firmware bundle is successfully completed, the installation may be safely aborted.

When it is identified that installation of the firmware bundle is under progress, the item identification instruction(s) 204 enable identification of a first set of items from the items included in the firmware bundle. The first set of items includes one of a successfully installed item, an item for which installation is under progress, and a combination thereof. In an example, if there are no successfully installed item(s), the first set of items includes the item for which installation is under progress when the abort installation command is received. Further, the item identification instruction(s) 204 cause identification of a second set of items from the items included in the firmware bundle, where the second set of items is pending installation. In an example, the item identification instruction(s) 204 causes the processor 102 to fetch the installation queue to obtain a list of the successfully installed item(s), the currently installing item, and item(s) pending installation. In an example, the successfully installed item(s) and the currently installing item are grouped in the first set of items. Item(s) pending installation are grouped in the second set of items.

Further, execution of the item identification instruction(s) 204 by the processor 102 causes the processor 102 to determine whether an operational dependency exists between the first set of items and the second set of items, based on the predefined dependency information. When it is determined that the first set of items are operationally independent of the second set of items, the item identification instruction(s) 204 enable aborting installation of the firmware bundle.

When it is determined that an operational dependency exists between the first set of items and the second set of items, the item identification instruction(s) 204 cause identification of a first subset of items from the second set of items, based on the predefined dependency information. The first subset of items is identified such that operability of an item from the first set of items is dependent on an item from the first subset of items. Thus, the first subset of items includes items which are pending installation and on which the successfully installed item(s) or the currently installing item is operationally dependent.

After identification of the first subset of items, the item identification instruction(s) 204 cause identification of a second subset of items from the second set of items, based on the predefined dependency information. The second subset of items are identified such that operability of the first set of items is independent of the second subset of items. Thus, the second subset of items includes items which are pending installation, while the successfully installed item(s) or the currently installing item are operationally independent of the second subset of items. The item identification instruction(s) 204 enable deletion of the second subset of items from the installation queue.

In an example, the item identification instruction(s) 204 enable identification of a third subset of items from the second set of items based on the predefined dependency information, such that operability of an item from the first subset of items is dependent on an item from the third subset of items. Thus, the third subset of items includes items which are pending installation and on which an item from the first subset of items is operationally dependent. In an example, the third subset of items, may be identified by analyzing the predefined dependency information.

After the third subset of items is identified, the item identification instruction(s) 204 enables installation of the currently installing item. After the currently installing item is installed successfully, the first subset of items is installed followed by the third subset of items being installed. After the third subset of items is installed, the item identification instruction(s) 204 are executed by the processor 102 that causes the processor 102 to abort installation of the firmware bundle.

Figure 3:
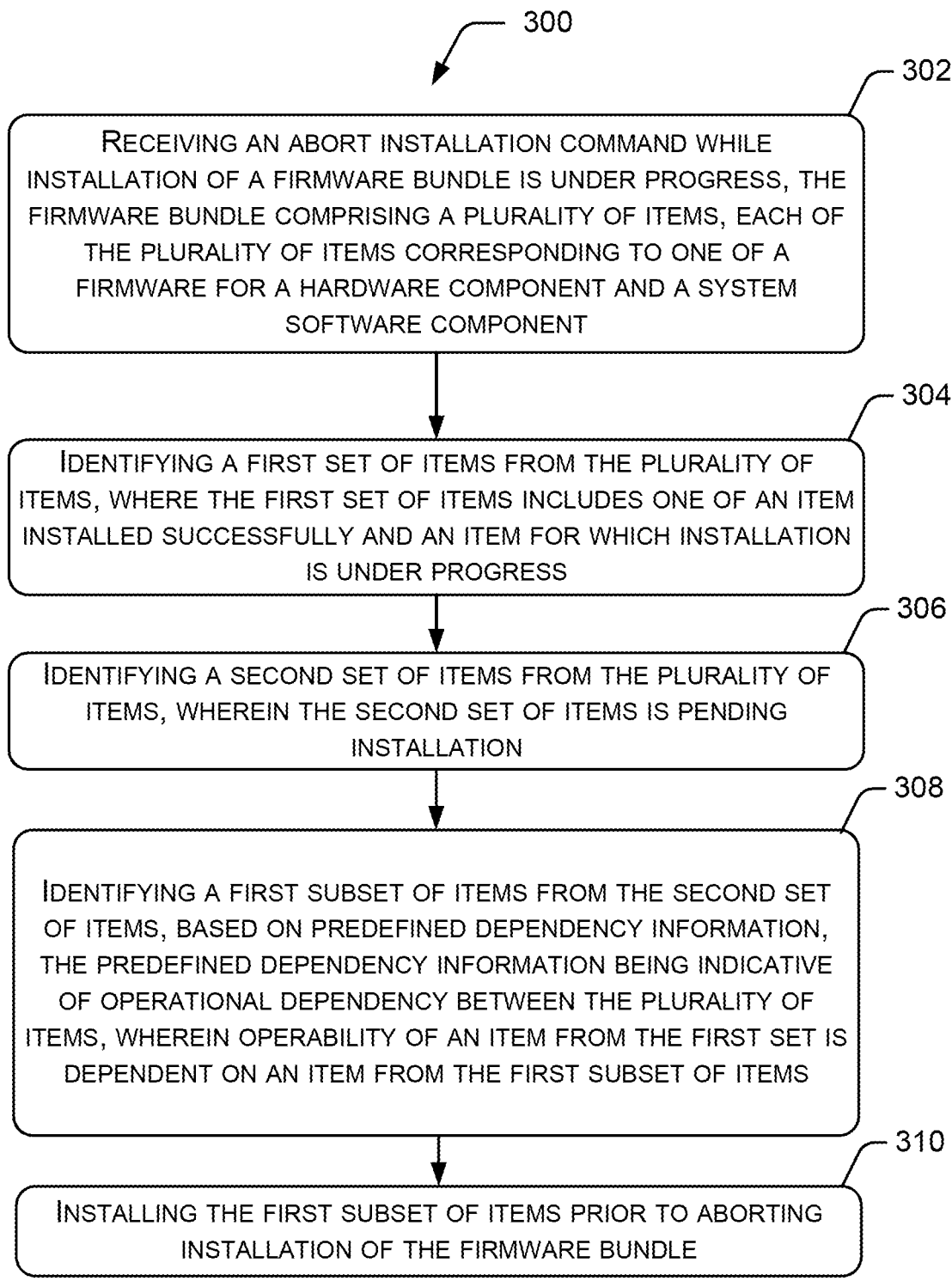
FIG. 3 illustrates a method for aborting installation of the firmware bundle, according to an example.

FIG. 3 illustrates a method 300 for aborting installation of a firmware bundle, according to an example. The method 300 may be executed by a system, such as the system 100 or 200. The method 300 can be implemented by processing resource(s) or computing device(s) through any suitable hardware, a non-transitory machine readable medium, or combination thereof. In an example, step(s) of the method 300 may be performed by execution of computer-readable instructions, such as the item identification instruction(s) 204, which includes instructions stored on a medium and executable by a processing resource, such as the processor 102, of a system, such as the system 100 or 200. Further, although the method 300 is described in context of the aforementioned system 100 or 200, other suitable systems may be used for execution of the method 300. It may be understood that processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3, at block 302, an abort installation command is received while installation of a firmware bundle is under progress in a system, such as the system 100 or 200. In an example, the abort installation command may correspond to a user input provided by a user/administrator of the system. The abort installation command indicates that installation of the firmware bundle is to be aborted. The firmware bundle includes a plurality of items. Each of the plurality of items correspond to one of a firmware for a hardware component and a system software component. The operability of an item in the firmware bundle may be dependent on another item in the firmware bundle. For example, the firmware bundle may include a firmware update for a hardware component A and a firmware update for a hardware component B. The firmware update for the hardware component A may be operationally dependent on the firmware update for the hardware component B. Such information of operational dependency between the items of the firmware bundle may be indicated through predefined dependency information. The predefined dependency information may be stored as a dependency list in a firmware image of the firmware bundle, where the firmware image is for upgrading of a firmware version. In an example, the dependency list may be stored as a metadata file in one of an Extensible Markup Language (xml) file format, a JavaScript Object Notation (json) file format, and a Text (txt) file format.

At block 304, a first set of items is identified from the plurality of items included in the firmware bundle. The first set of items includes one of an item installed successfully, an item for which installation is under progress, and a combination thereof. At block 306, identifying a second set of items from the plurality of items. The second set of items include items pending installation. In an example, the second set of items may be arranged in a sequential order in an installation queue which maintains a list of items which are pending installation.

At block 308, a first subset of items is identified from the second set of items, based on the predefined dependency information, such that operability of an item from the first set of items is dependent on an item from the first subset of items. At block 310, the first subset of items is installed prior to aborting installation of the firmware bundle.

Figure 4A:
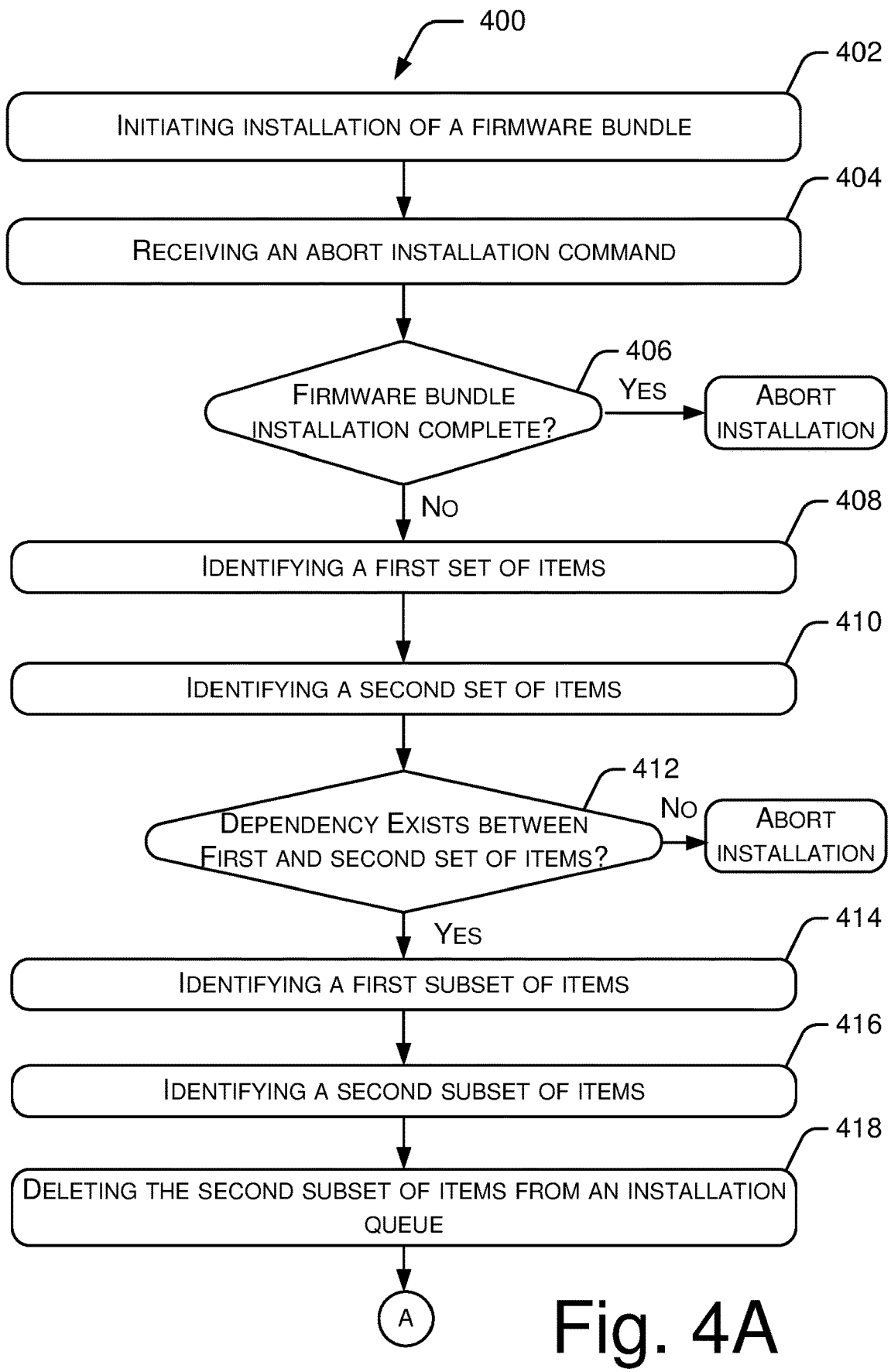
FIGS. 4A and 4B illustrate a method for aborting installation of the firmware bundle, according to another example.
Figure 4B:
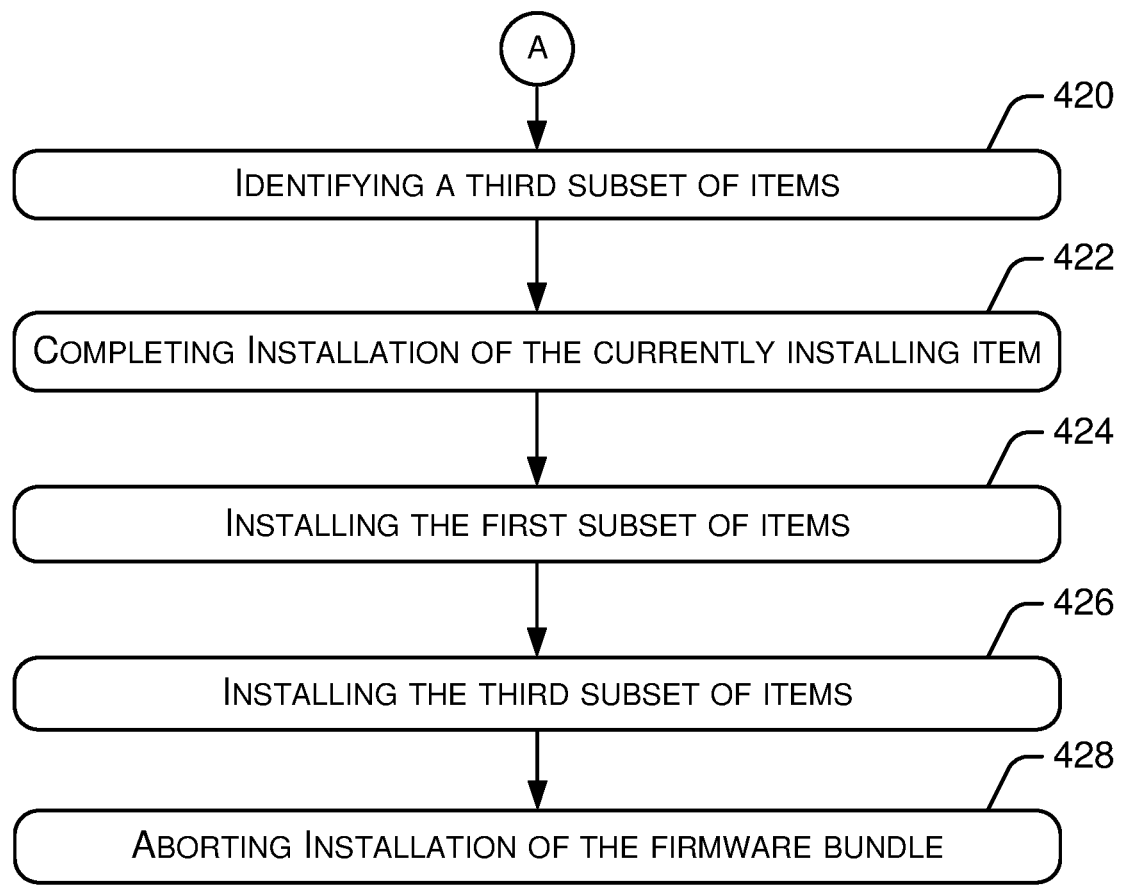

FIGS. 4A and 4B illustrate a method 400 for aborting installation of a firmware bundle, according to an example. The method 400 may be executed by a system, such as the system 100 or 200. The method 400 can be implemented by processing resource(s) or computing device(s) through any suitable hardware, a non-transitory machine readable medium, or combination thereof. In an example, the method 400 may be performed by computer-readable instructions, such as the item identification instruction(s) 204 which includes instructions stored on a medium and executable by a processing resource, such as the processor 102, of a system, such as the system 100 or 200. Further, although the method 400 is described in context of the aforementioned system 100 or 200, other suitable systems may be used for execution of the method 400. It may be understood that processes involved in the method 400 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIGS. 4A and 4B, at block 402, installation of a firmware bundle may be initiated. The firmware bundle includes items which are firmware for a hardware component of the system or a system software component, such as a device driver. An item of the firmware bundle may be operationally dependent on another item of the firmware bundle. Operational dependency of the items may be predefined in a dependency list which provides a predefined dependency information. The installation of the firmware bundle may be initiated by executing a firmware image. In an example, the predefined dependency information may be stored in the firmware image. During installation of the firmware bundle, the items are sequentially arranged in an installation queue which maintains a list of items which are pending installation. The items are installed one after another based on the sequence in the installation queue.

While the installation is under progress, an abort installation command is received from a user/administrator of the system, at block 404. At block 406, it is checked whether the installation of the firmware bundle is complete. In an example, the installation queue may be analyzed to determine whether the installation is complete.

If the installation is incomplete, a first set of items is identified, at block 408 ("No" branch from block 406) from the items of the firmware bundle. The first set of items includes an item installed successfully, or an item for which installation is under progress, or both.

At block 410, a second set of items is identified from the items in the firmware bundle. The second set of items is pending installation. At block 412, it is checked whether an operational dependency exists between the first set of items and the second set of items, based on the predefined dependency information. When it is determined that the first set of items are operationally independent of the second set of items, installation of the firmware bundle is aborted.

When it is determined that an item from the first set is dependent on an item from the second set, a first subset of items is identified from the second set of items, based on the predefined dependency information, at block 414. Operability of an item from the first set is dependent on an item from the first subset of items.

After the first subset of items are identified, at block 416, a second subset of items may be identified from the second set of items, based on the predefined dependency information, such that operability of the first set of items is independent of the second subset of items. At block 418, the second subset of items are deleted from the installation queue.

At block 420, a third subset of items is identified from the second set of items based on the predefined dependency information, such that operability of an item from the first subset is dependent on an item from the third subset of items. At block 422, installation is completed for an item for which installation is currently under progress. At block 424, the first subset of items is installed. At block 426, the third subset of items is installed. After successful installation of the third subset of items, the installation of the firmware bundle is aborted, at block 428.

Figure 5:
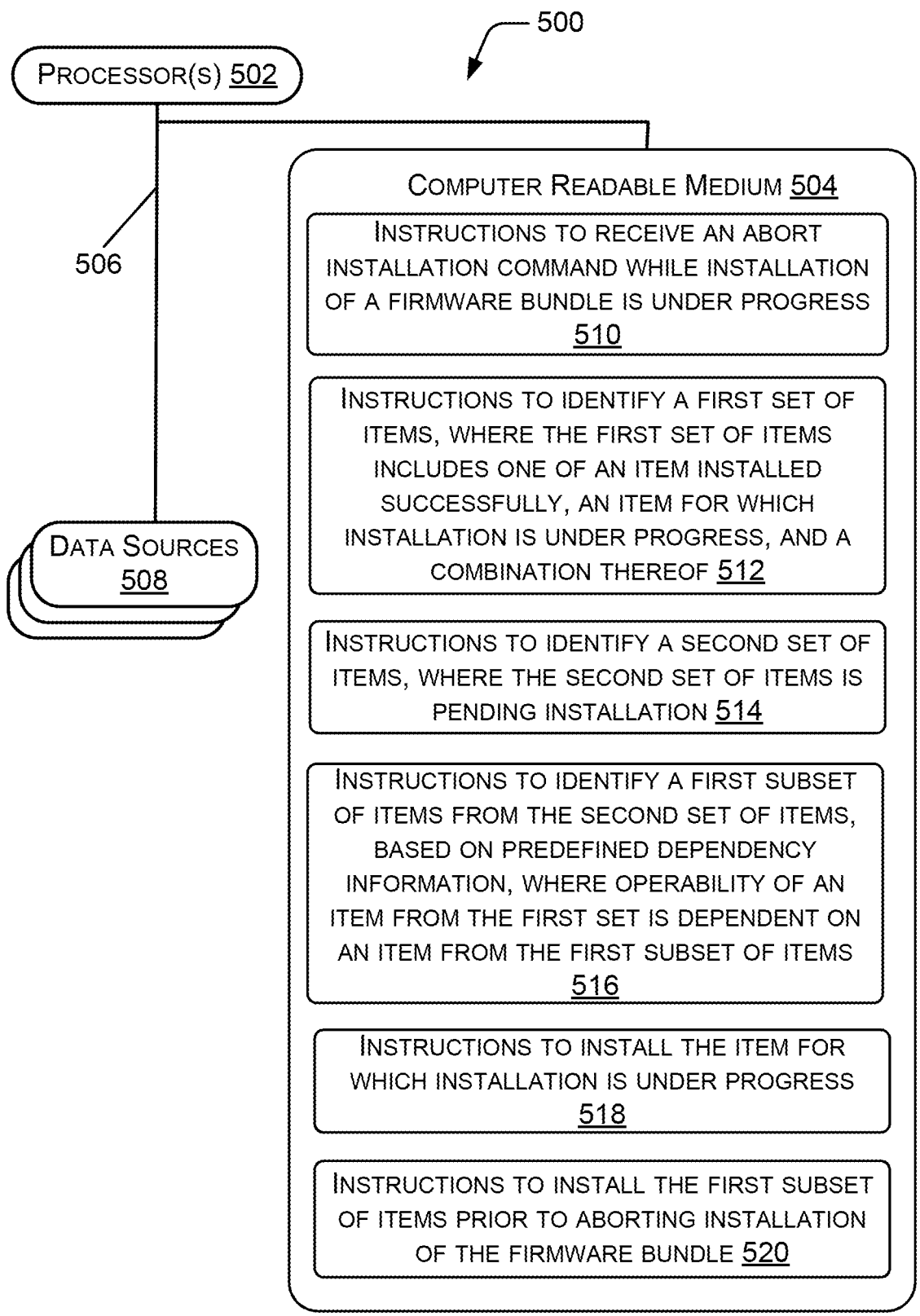
FIG. 5 illustrates a system environment implementing a non-transitory computer-readable medium for aborting installation of the firmware bundle, according to an example.

FIG. 5 illustrates a system environment 500 implementing a non-transitory computer-readable medium for aborting installation of a firmware bundle, according to an example. In an example, the system environment 500 includes processor(s) 502 communicatively coupled to a non-transitory computer-readable medium 504 through a communication link 506. In an example, the system environment 500 may be a system, such as the system 100 or 200. In an example, the processor(s) 502 may have one or more processing resources for fetching and executing computer-readable instructions from the non-transitory computer-readable medium 504.

The non-transitory computer-readable medium 504 can be, for example, an internal memory device or an external memory device. In an example implementation, the communication link 506 may be a direct communication link, such as any memory read/write interface.

The processor(s) 502 and the non-transitory computer-readable medium 504 may also be communicatively coupled to data sources 508 over a network, such as the Internet. The data sources 508 can include, for example, memory of the system, such as the system 100 or 200.

In an example implementation, the non-transitory computer-readable medium 504 includes a set of computer-readable instructions which can be accessed by the processor(s) 502 through the communication link 506 and subsequently executed to perform acts for aborting installation of a firmware bundle.

Referring to FIG. 5, in an example, the non-transitory computer-readable medium 504 includes instructions 510 that cause the processor(s) 502 to receive an abort installation command while installation of a firmware bundle is under progress. The firmware bundle includes a plurality of items, each of the plurality of items corresponding to one of a firmware for a hardware component and a system software component. The items may be operationally dependent on one another. The firmware bundle may include predefined dependency information indicative of operational dependency between the items. In an example, the predefined dependency information may be stored as a dependency list in a firmware image of the firmware bundle, where the firmware image is for upgrading of a firmware version.

Further, the non-transitory computer-readable medium 504 includes instructions 512 that cause the processor(s) 502 to identify a first set of items from the items included in the firmware bundle. The first set of items includes one of an item installed successfully, an item for which installation is under progress, or a combination thereof.

The non-transitory computer-readable medium 504 includes instructions 514 that cause the processor(s) 502 to identify a second set of items from the items included in the firmware bundle, where the second set of items is pending installation. Further, in an example, the non-transitory computer-readable medium 504 includes instructions that cause the processor(s) 502 to determine whether an operational dependency exists between the first set of items and the second set of items, based on the predefined dependency information. When it is determined that the first set of items are operationally independent of the second set of items, the non-transitory computer-readable medium 504 includes instructions that cause the processor(s) 502 to abort installation of the firmware bundle.

When it is determined that an item form the first set of items is operationally dependent on an item from the second set of items, the non-transitory computer-readable medium 504 includes instructions 516 that cause the processor(s) 502 to identify a first subset of items from the second set of items, based on the predefined dependency information, such that operability of an item from the first set is dependent on an item from the first subset of items.

In an example, the non-transitory computer-readable medium 504 includes instructions that cause the processor(s) 502 to identify a second subset of items from the second set of items based on the predefined dependency information, after identifying the first subset of items. Operability of the first set of items is independent of the second subset of items. The non-transitory computer-readable medium 504 includes instructions that cause the processor(s) 502 to delete the second subset of items from the installation queue.

In another example, the non-transitory computer-readable medium 504 includes instructions that cause the processor(s) 502 to identify a third subset of items from the second set of items based on the predefined dependency information, such that operability of an item from the first subset is dependent on an item from the third subset of items.

The non-transitory computer-readable medium 504 includes instructions 518 that cause the processor(s) 502 to install the item for which installation is under progress. Further, the non-transitory computer-readable medium 504 includes instructions 520 that cause the processor(s) 502 to install the first subset of items prior to aborting installation of the firmware bundle. After the first subset of items is installed, the installation of the firmware bundle may be aborted without adversely operability of the system.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method comprising:
receiving an abort installation command directed to aborting installation of a firmware bundle while installation of the firmware bundle is under progress, the firmware bundle comprising a plurality of items, each of the plurality of items corresponding to a firmware for a hardware component or a system software component;
identifying a first set of items from the plurality of items, wherein the first set of items includes one of an item installed successfully, an item for which installation is under progress, and a combination thereof;
identifying a second set of items from the plurality of items, wherein the second set of items is pending installation;
identifying a first subset of items from the second set of items, based on predefined dependency information, the predefined dependency information being indicative of operational dependency between the plurality of items, wherein operability of an item from the first set of items is dependent on an item from the first subset of items;
aborting installation of the firmware bundle responsive to the abort installation command; and
installing the first subset of items prior to aborting installation of the firmware bundle.

2. The method as claimed in claim 1, further comprising:
after identifying the first subset of items, identifying a second subset of items from the second set of items, based on the predefined dependency information, wherein operability of the first set of items is independent of the second subset of items; and
deleting the second subset of items from an installation queue, wherein the installation queue maintains a list of items which are pending installation.

3. The method as claimed in claim 1, wherein aborting installation of the firmware bundle comprises aborting the installation of the firmware bundle responsive to the first subset of items being installed.

4. The method as claimed in claim 1, further comprising:
prior to identifying the first subset of items, determining whether an operational dependency exists between the first set of items and the second set of items, based on the predefined dependency information,
wherein aborting installation of the firmware bundle comprises aborting the installation of the firmware bundle responsive to determining that the first set of items are operationally independent of the second set of items.

5. The method as claimed in claim 1, further comprising:
identifying a third subset of items from the second set of items based on the predefined dependency information, wherein operability of an item from the first subset is dependent on an item from the third subset of items; and
installing the third subset of items prior to aborting installation of the firmware bundle.

6. The method as claimed in claim 1, further comprising:
installing the item for which installation is under progress, prior to installing the first subset of items.

7. The method as claimed in claim 1, wherein the predefined dependency information is stored as a dependency list in a firmware image of the firmware bundle, wherein the firmware image is for upgrading of a firmware version.

8. The method as claimed in claim 7, wherein the dependency list is stored as a metadata file in one of an Extensible Markup Language (xml) file format, a JavaScript Object Notation (json) file format, and a Text (txt) file format.

9. A system comprising:
a processor; and
a memory coupled to the processor, the memory storing instructions executable by the processor to:
identify a first set of items from a plurality of items included in a firmware bundle on receiving a command to abort installation of the firmware bundle while the installation is under progress, each of the plurality of items corresponding to one of a firmware for a hardware component of the system or a system software component, wherein the first set of items includes one of an item installed successfully, or an item for which installation is under progress, and a combination thereof;

identify a second set of items from the plurality of items, wherein the second set of items is pending installation;

identify a first subset of items from the second set of items, based on predefined dependency information, the predefined dependency information being indicative of operational dependency between the plurality of items, wherein operability of an item from the first set of items is dependent on an item from the first subset of items;

install the first subset of items; and responsive to the command, abort installation of the firmware bundle after the first subset of items is installed.

10. The system as claimed in claim 9, wherein the processor is further to:

after identifying the first subset of items, identify a second subset of items from the second set of items, based on the predefined dependency information, wherein operability of the first set of items is independent of the second subset of items; and delete the second subset of items from an installation queue, wherein the installation queue maintains a list of items which are pending installation.

11. The system as claimed in claim 9, wherein the processor is further to:

prior to identifying the first subset of items, determine whether an operational dependency exists between the first set of items and the second set of items, based on the predefined dependency information; and cause installation of the firmware bundle to be aborted responsive to the determination that the first set of items are operationally independent of the second set of items.

12. The system as claimed in claim 9, wherein the processor is further to:

identify a third subset of items from the second set of items based on the predefined dependency information, wherein operability of an item from the first subset is dependent on an item from the third subset of items; and install the third subset of items prior to aborting installation of the firmware bundle.

13. The system as claimed in claim 9, wherein the processor is further to:

install the item for which installation is under progress, prior to installing the first subset of items.

14. The system as claimed in claim 9, wherein the predefined dependency information is stored as a dependency list in a firmware image of the firmware bundle, wherein the firmware image is for upgrading of a firmware version.

15. The system as claimed in claim 14, wherein the dependency list is stored as a metadata file in one of an Extensible Markup Language (xml) file format, a JavaScript Object Notation (json) file format, and a Text (txt) file format.

16. A non-transitory computer-readable medium comprising computer-readable instructions, the computer-readable instructions when executed by a processor, cause the processor to:

receive an abort installation command directed to aborting installation of a firmware bundle while installation of the firmware bundle is under progress, the firmware bundle comprising a plurality of items, each of the plurality of items corresponding to one of a firmware for a hardware component or a system software component;

identify a first set of items from the plurality of items, wherein the first set of items includes one of an item installed successfully, an item for which installation is under progress, and a combination thereof;

identify a second set of items from the plurality of items, wherein the second set of items is pending installation;

identify a first subset of items from the second set of items, based on predefined dependency information, the predefined dependency information being indicative of operational dependency between the plurality of items, wherein operability of an item from the first set of items is dependent on an item from the first subset of items;

install the item for which installation is under progress;

abort installation of the firmware bundle responsive to the abort installation command; and install the first subset of items prior to aborting installation of the firmware bundle.

17. The non-transitory computer-readable medium as claimed in claim 16, wherein the computer-readable instructions, when executed by the processor, further cause the processor to:

identify a second subset of items from the second set of items based on the predefined dependency information, after identifying the first subset of items, wherein operability of the first set of items is independent of the second subset of items; and delete the second subset of items from an installation queue, wherein the installation queue maintains a list of items which are pending installation.

18. The non-transitory computer-readable medium as claimed in claim 16, wherein the computer-readable, when executed by the processor, further cause the processor to:

prior to identifying the first subset of items, determine whether an operational dependency exists between the first set of items and the second set of items, based on the predefined dependency information; and cause installation of the firmware bundle to be aborted responsive to the determination that the first set of items are operationally independent of the second set of items.

19. The non-transitory computer-readable medium as claimed in claim 16, wherein the computer-readable instructions, when executed by the processor, further cause the processor to:

identify a third subset of items from the second set of items based on the predefined dependency information, wherein operability of an item from the first subset is dependent on an item from the third subset of items; and install the third subset of items prior to aborting installation of the firmware bundle.

20. The non-transitory computer-readable medium as claimed in claim 16, wherein the predefined dependency information is stored as a dependency list in a firmware image of the firmware bundle, wherein the firmware image is for upgrading of a firmware version.

* * * * *